(12) United States Patent
Schwinn

(10) Patent No.: US 7,186,366 B2
(45) Date of Patent: Mar. 6, 2007

(54) RECYCLABLE LABEL FOIL

(75) Inventor: Georg Schwinn, Gronau (DE)

(73) Assignee: Nordenia U.S.A., Inc., Jackson, MO (US)

( * ) Notice: Subject to any disclaimer, the term of this patent is extended or adjusted under 35 U.S.C. 154(b) by 481 days.

(21) Appl. No.: 10/636,667

(22) Filed: Aug. 6, 2003

(65) Prior Publication Data

US 2004/0056389 A1  Mar. 25, 2004

Related U.S. Application Data

(62) Division of application No. 09/471,433, filed on Dec. 22, 1999, now abandoned.

(30) Foreign Application Priority Data

Dec. 23, 1998 (DE) ................................ 198 59 789

(51) Int. Cl.
  *B29C 49/24*  (2006.01)

(52) U.S. Cl. ...................................... 264/509; 264/918
(58) Field of Classification Search ................ 264/509, 264/918

See application file for complete search history.

(56) References Cited

U.S. PATENT DOCUMENTS 4,713,273 A * 12/1987 Freedman .................. 428/41.8
4,904,324 A *  2/1990 Heider ........................ 156/214
6,461,706 B1* 10/2002 Freedman et al. ......... 428/40.1

\* cited by examiner

*Primary Examiner*—Suzanne E. McDowell
(74) *Attorney, Agent, or Firm*—Milde & Hoffberg, LLP

(57) ABSTRACT

A label foil is disclosed that is suitable for in-mold labeling, has a high stiffness, is well suited for cutting and is recyclable. The top layers of the label foil are made of polyethylene. Both top layers have about the same thickness and the core layer has a thickness that is about 5 times to 20 times that of one top layer.

10 Claims, 3 Drawing Sheets

RECYCLABLE LABEL FOIL

CROSS-REFERENCE TO RELATED APPLICATION

Figure 1A:
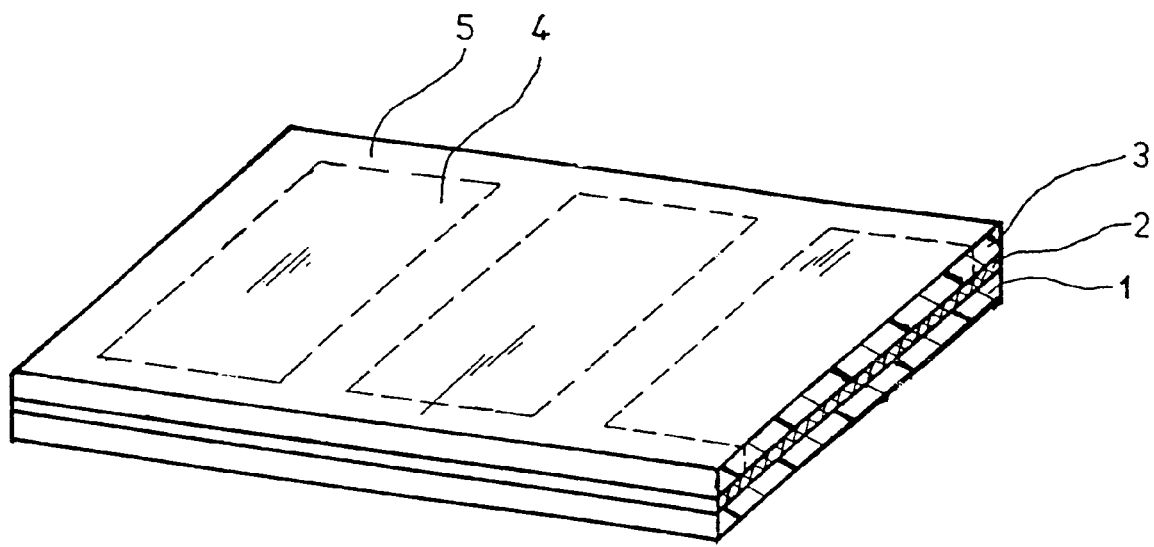

This application is a divisional application of U.S. patent application Ser. No. 09/471,433, filed Dec. 22, 1999, now abandoned.

The invention relates to a recyclable label foil.

According to the state-of-the-art, label foils made of mono- or bi-axially oriented polyesters or oriented polypropylene (OPP). The label foil is printed and bonded to a release liner that is provided with an adhesive layer. The entire composite consisting of release liner, adhesive layer and label foil is cut and the excess is taken up as a cut grid. For this purpose, it is important that the foil has a good cutability. A series of separate foil sections remains on the release liner.

During dispensing, that is, during the application of the label on the container or similar object to be labeled, the release liner is redirected with a small bending radius in a large angle whereby the label section is released from the release liner. In front of the object to be labeled, the release liner is redirected with a small bending radius and a large angle, whereby the label section is released from the release liner. The stiffness of the label section is large enough such that the part of the label section that is already released from the release liner can be pushed in a "free-floating" manner to the contact point at the object to be labeled without bending away from the desired path.

However, a disadvantage of known recyclable label foils is that a cost-intensive orienting of the starting material is absolutely essential to ensure a sufficient stiffness of the label section, and thus the problem-free application with automatic labeling devices. In addition, the synthetic materials suitable for the labels, in particular PET (polyethylene terephtalate), are relatively expensive.

It is, therefore, the principal objective of the present invention to provide a cost-efficient label foil that exhibits a high stiffness such that good processability in labeling devices is ensured. In addition, the label foil shall have good cutability such that clean cutting edges occur at the cut label section. The recylability of the label foil must be ensured; if possible, the applied label foil shall be recyclable together with the packaging.

According to the invention, this objective mentioned above is accomplished with a recyclable label foil with at least
one first top layer made of polyethylene,
one core layer made of polypropylene,
one second top layer made of polyethylene, where the top layers each have about the same thickness and where the core layer has about 5 times to 20 times the respective thickness of one top layer.

An advantage of the label foil subject to the invention is that it is manufactured exclusively of polyolefines, that is, of inexpensive mass synthetics that are also used to manufacture most of the packages for goods of daily consumption. Polyethylene and polypropylene have a good mixability and a good reusability as a mixed recycled product. The symmetric design prevents a tendency of the label foil to roll during processing such that the label foil is in plain contact during processing. It is further advantageous that the synthetic materials of the top and core layers can be coextruded as a blow or cast foil because of the good compatibility of the polyolefines PE and PP. Due to the core layer, which is made of polypropylene and has a significantly greater thickness when compared to the top layers, a high stiffness of the label foil is achieved. Orienting of the foil is no longer required, which results in the possibility of significant cost reductions. In addition, the cutting dies experience a high resistance because of the thick core layer of polypropylene such that a clean cut is obtained at the cutting line. A plastic deformation of the synthetic material in the area of the cut, which would lead to fraying, is avoided.

The invention also relates to a recyclable label foil that is suitable for In-mold Labeling (IML) of synthetic containers that are produced by extrusion blow molding. A recyclable IML label foil with at least three co-extruded layers is known from the German Patent No. DE 43 06 103 A1, where the at least one core layer is located between two top layers and where at least one of the top layers consists of a sealable synthetic material that softens at or below the temperature of the blow mold. Either the seal layer or the core layer is foamed, which allows for better compensation of the heat tensions within the label, such that optical error spots such as wrinkles or bubbles can be largely avoided with the labels that are attached to the container. Because of the exclusive use of polyolefines in the laminate structure, the labels are well suited for recycling.

However, it has been found that the stiffness of such a foil is not sufficient for secure handling by a machine, such that sections of the label snap off, get stuck in the transport paths and thus cause interruptions in the operating process. Additionally, changes in the thickness of the foamed layer of the label can be observed that are the result of pressure effects prior to the application (e.g., during printing) and/or of heat effects when applying the label during blow molding. This results in an uneven surface on the printed visible side, which optically, is hardly attractive. Furthermore, the application of foamed layers requires additional plant investments and processing steps for the production.

It is, therefore, a further objective of the present invention to create an inexpensive, recyclable label foil that is suitable for in-mold labeling, has a high stiffness, is well suited for cutting and is recyclable. The aforementioned disadvantages of known IML label foil should be avoided.

This objective is achieved with a label foil that is suitable for in-mold labeling of the kind mentioned above that is characterized
in that the top layer is made of polyethylene and the core layer is made of polypropylene, and
in that both top layers have about the same thickness and the core layer has a thickness that is about 5 times to 20 times that of one top layer.

Significant to the invention is the layer design and the thickness ratio of the layers. In addition to the improvement in the suitability for machine handling due to the high stiffness of the thick core layer, an improvement is also realized in the properties at increased temperatures. The symmetric design avoids the tendency of warping and rolling during temperature changes. The thick core layer can obtain significantly more heat than the relatively low amount of heat that is transferred when melting on the seal layer. Regardless of the high stiffness, the section of the label foil must, with the processing steps described above, contact the inside of the blow form plainly, and since generally cylindrical or otherwise rounded containers are labeled with the in-mold labeling method, the outer area of the label section must be stretched and the inner area, which is to be applied to the container, must be compressed. With the label foils subject to the invention, the fact that the top layers are thin and soften at relatively low temperatures that correspond approximately to the tool wall temperature of the blow mold aids in this regard, such that a plastic deformation of the top layers, and thus, an adjustment of the shape of the label section, is made possible in the blow mold. However, the thick core remains stable in its shape.

Sealing to the container is accomplished without an additional adhesive. Rather, the invention provides top layers that seal at low temperatures. In a preferred embodiment, the synthetic material of the top coating has a flow behavior that is characterized by a melt flow index MFI (German Industry Standard—DIN 53735, 190° C./2.16 kg test conditions) of 5 to 30 g/10 min. preferably of 10 to 20 g/10 min.

With a recyclable label foil that is stiff in the delivery condition, the suitability for sealing is achieved through various designs of the top coatings. The top coatings can, preferably, be made of:

low density polyethylene (PE-LD) with a density of 0.915 to 0.920 g/cm$^3$,
low density linear polyethylene polymerized with metallocene catalysts (PE-LLD) with a density of 0.915 to 0.985 g/cm$^3$,
a mixture of low density polyethylene (PE-LD) with a density of 0.915 to 0.985 g/cm$^3$ and low density linear polyethylene (PE-LLD) with a density of 0.935 to 0.985 g/cm$^3$,
an ethylene vinyl acetate copolymer (EVA) with a vinyl acetate content of 25 to 40 percent in weight,
an ethylene copolymer or an ethylene terpolymer with a sealing temperature range from 60 to 85° C.

It is also possible to fill the core layer with mineral filler materials such as chalk, lime or talc. A fill content of 5 to 40 percent in weight advantageously achieves a further improvement of the thermal and mechanical durability and at same time improves the economic aspect through material savings at the relatively thick core layer.

To achieve a good bond between the individual layers of the label foil, especially with a high filler material content of the core layer, an embodiment is advantageous, where the label foil is a five-layer co-extruded product, where a co-extruded adhesion-supporting layer is located between each of the top layers and the core layer.

Figure 1B:
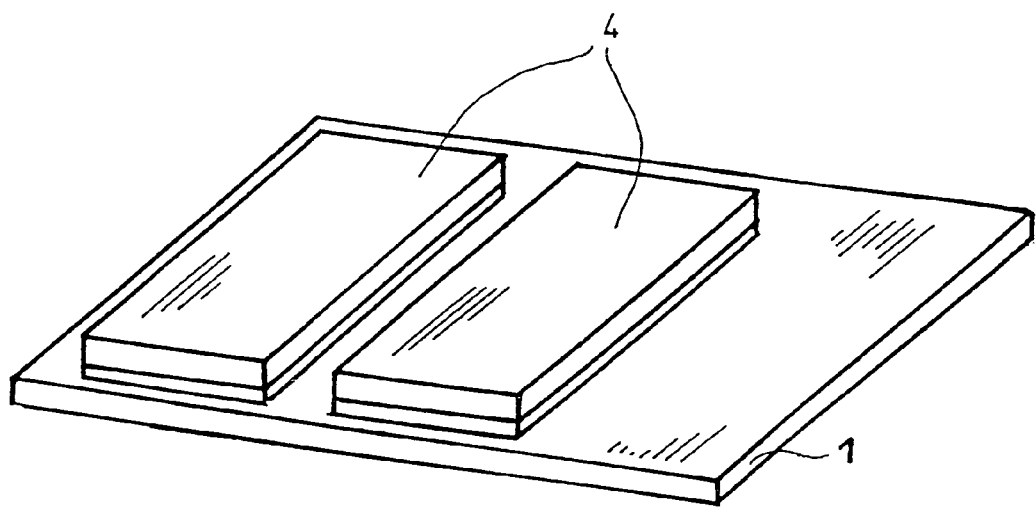
Figure 2:
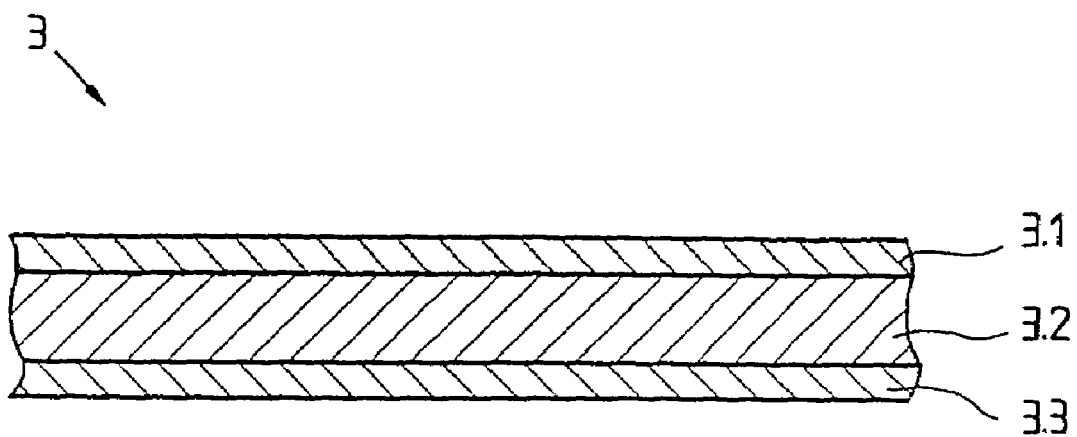
Figure 3:
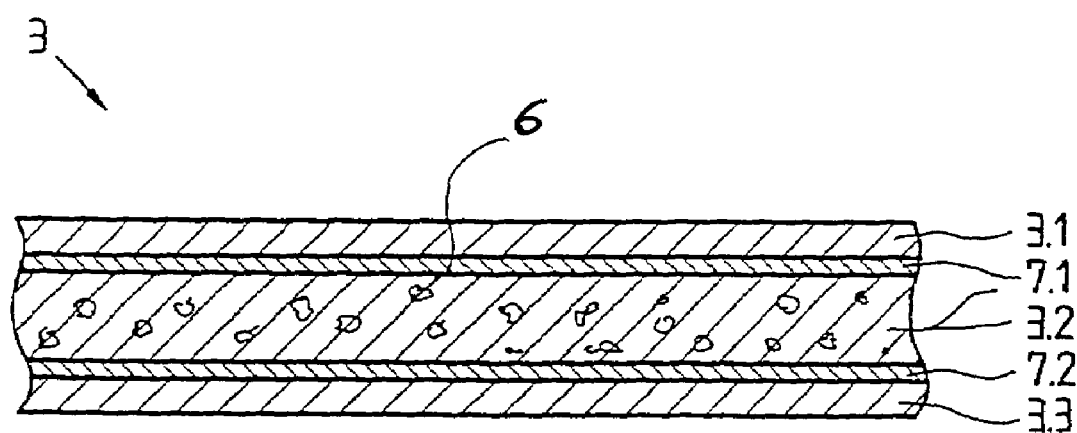
Figure 4:
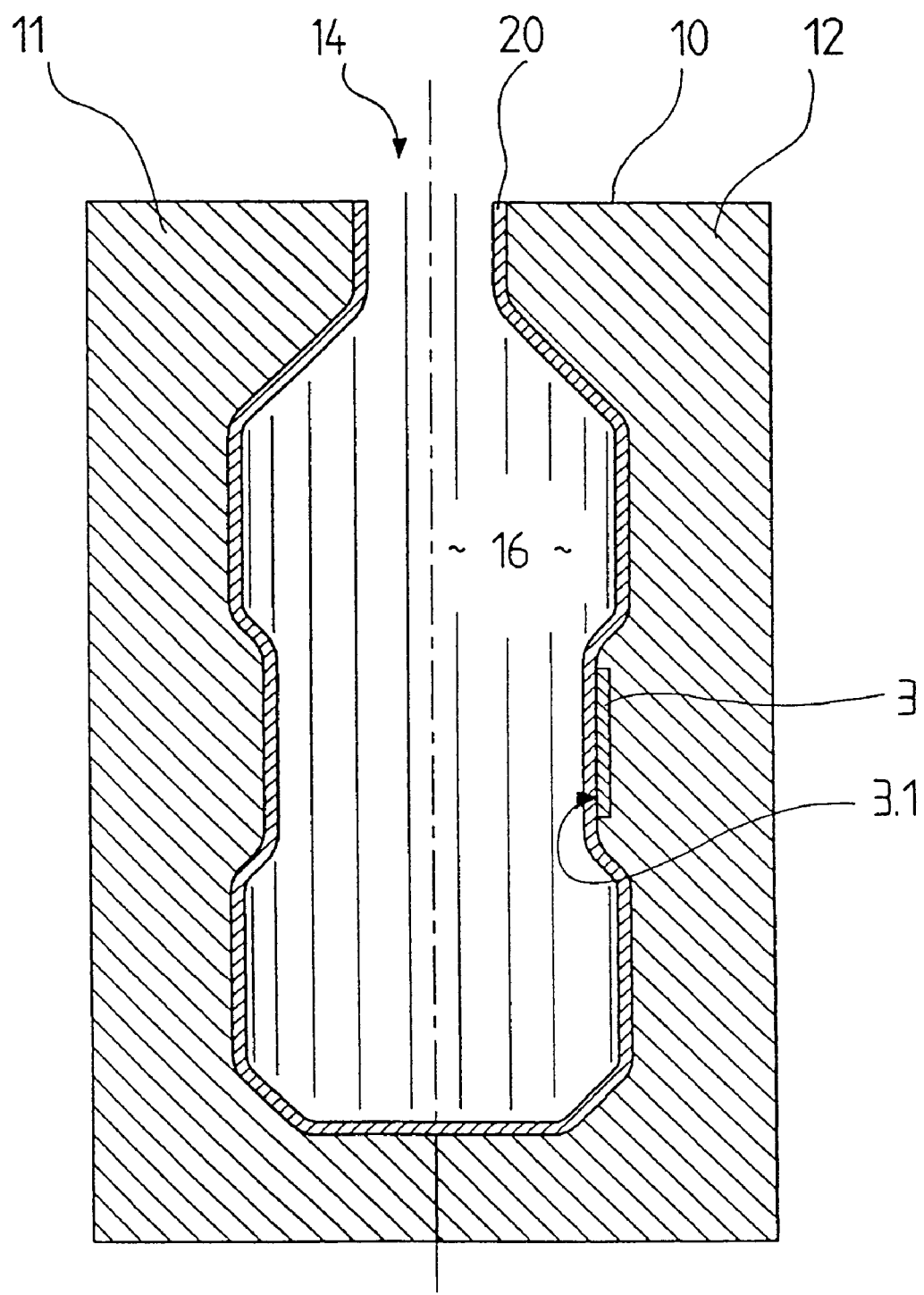

The invention will become more readily apparent from the following description of exemplary embodiments and the drawings, wherein FIG. 1a shows a schematic presentation of a laminate of release liner, adhesive layer and label foil, FIG. 1b shows a schematic presentation of the label foil with attached labels after cutting and removing of the cutting grid, FIG. 2 shows a schematic sectional view of a label foil according to the invention, FIG. 3 shows another embodiment of a label foil in schematic sectional view as well, and FIG. 4 shows a schematic section through a blow mold tool with hollow body and in-mold label.

FIG. 1a shows a laminate for labeling of packaging, for example. A silicon compound acting as an anti-adhesion coating is applied to one of the top layers of the release layer 1, and after hardening, an adhesion layer 2 is applied. This may be a melt adhesive or an adhesive that is available in an aqueous or solvent-containing dispersion, for example, ethylene vinyl alcohol (EVAc). An already printed label foil 3 is then laminated to the adhesion layer 2. The label foil 3 is cut along the contour shown as a dashed line 5 resulting in label sections 4 being worked out of the label foil 3. The cutting is carried out with cutting dies that penetrate at least the label foil 3 and the adhesive layer 2. The area of the label foil 3 that is outside the label sections is removed as a connected cut grid, such that the result is a release liner 1 with numerous label sections 4 arranged in a row as shown in FIG. 1b. This is fed to an automatic dispenser, where the label sections are released and applied to packaging or similar objects.

The label foil 3 shown in FIG. 2 is manufactured as a three-layer co-extruded product as blow foil and exhibits the following characteristics:

The top layers 3.1, 3.3 are made of high density polyethylene (HDPE) with a density ρ of 0.930 to 0.960 g/cm$^3$, a melt flow index MFI (DIN 53735, 190° C./2.16 kg test conditions) of 3 to 7 g/10 min. and have a thickness of 2 to 10 μm, preferably of 3 to 7 μm.

The core layer 3.2 is made of polypropylene with a melt flow index MFI (DIN 53735, 190° C./2.16 kg test conditions) of 0.2 to 4 g/10 min, preferably of 0.2 to 2 g/10 min.

The label foil 3 exhibits an overall thickness of 40 to 80 μm, preferably of 50 to 70 μm.

The melting point of the core layer 3.2 is greater than 155° C.

FIG. 3 shows another embodiment of a label foil 3. With this foil, the core layer 3.2 is filled with mineral filler materials 6 such as chalk, lime or talc. The filler content is 2 to 20 percent in weight, preferably around 10 percent in weight. The preferred filler material is talc with a particle size of 2 to 20 μm, preferably a particle size of 2 to 5 μm. This adjusts the material of the core layer 3.2 to a greater brittleness, such that the cutability is improved and particularly clear cutting edges are achieved.

To strengthen the inner bond between the top layers 3.1, 3.3 and the core layer 3.2, the label foil 3 in this embodiment can be co-extruded as a five-layer laminate with adhesion-supporting layers 7.1, 7.2, resulting in the following layer sequence:

a first top layer 3.1
a first adhesion-supporting layer 7.1
a core layer 3.2
a second adhesion-supporting layer 7.2
a second top layer 3.3

Here, the preferred thickness of the adhesion-supporting layers 7.1, 7.2 is 5 to 8 μm.

The label foil 3 subject to the invention in an additional embodiment is suited for in-mold labeling.

As FIG. 4 shows, an in-mold-label 3 is placed in a blow mold tool 10 that consists of two tool sections 11, 12. In the closed condition, the tool sections 11, 12 form a tool cavity 16 and are moved apart to retrieve the finished hollow body 20.

A hose-shaped softened mold blank that is closed on one side is lowered into the tool cavity 16 through an upper tool opening 14 and is expanded by feeding in blow air until the plastical formable wall of the mold blank contacts the wall of the tool, where it solidifies while forming a hollow body 20. In this process, the mold blank contacts the easily sealable top layer 3.1 in the location where the in-mold-label is placed, and forms a solid bond with said sealable top layer by melting into each other, thus preventing label 3 from falling off of the finished hollow body 20.

Coloring of the label foil 3 is accomplished by adding pigments to at least one of the top and/or core layers 3.1, 3.2, 3.3. For example, white coloring pigments such as titanium oxide can be used inexpensively. Coloring has the result that the contrast of the printing is richer. It may also be possible to reduce the usage of printing dye by coloring the label foil 3. With a small amount of pigment additives in the label foil 3, an opaque foil with a respective optical effect can be created, particularly in combination with rear, transparent printing.

In processing, the label foil of the invention distinguishes itself through a low tendency of rolling, good cutting behavior and high stiffness. The structure of standard polyolefines leads to a cost-effective label foil well suited for recycling.

The invention claimed is:

1. In a method for in-mold labeling of synthetic containers to be produced by extrusion blow molding, said method comprising the steps of:
   a) placing a label in a blow mold tool forming a tool cavity, the label comprising a recyclable label foil with at least three co-extruded layers, wherein two top layers of the label foil are made of polyethylene and each have about the same thickness, and wherein a core layer, located between the top layers, is made of polypropylene and has about 5 times to 20 times the respective thickness of one top layer;
   b) lowering a hose shaped, softened mold blank through an upper tool opening into the tool cavity; and
   c) expanding the mold blank by feeding in blow air until the plastic formable wall of the mold blank contacts the wall of the tool where the mold blank solidifies while forming a hollow body;
   wherein in step (c) the mold blank contacts the label in the location where the label is placed and forms a solid bond with the label by melting top layers of the blank and the label into each other; and
   wherein the synthetic material of the top layers exhibits a melt flow index MFI (DIN 53735, 190° C./2.16 kg test conditions) of 5 to 30 g/10 min.

2. A method as set forth in claim 1, wherein the two top layers of the label foil are made of low density polyethylene (PE-LD) with a density of 0.915 to 0.920 g/cm$^3$.

3. In a method for in-mold labeling of synthetic containers to be produced by extrusion blow molding, said method comprising the steps of:
   a) placing a label in a blow mold tool forming a tool cavity, the label comprising a recyclable label foil with at least three co-extruded layers, wherein two top layers of the label foil are made of polyethylene and each have about the same thickness, and wherein a core layer, located between the top layers, is made of polypropylene and has about 5 times to 20 times the respective thickness of one top layer;
   b) lowering a hose shaped, softened mold blank through an upper tool opening into the tool cavity; and
   c) expanding the mold blank by feeding in blow air until the plastic formable wall of the mold blank contacts the wall of the tool where the mold blank solidifies while forming a hollow body,
   wherein in step (c) the mold blank contacts the label in the location where the label is placed and forms a solid bond with the label by melting top layers of the blank and the label into each other, and wherein the two top layers of the label foil are made of low density linear polyethylene polymerised with metallocene catalysts (PE-LLD) with a density of 0.915 to 0.985 g/cm$^3$.

4. In a method for in-mold labeling of synthetic containers to be produced by extrusion blow molding, said method comprising the steps of:
   a) placing a label in a blow mold tool forming a tool cavity, the label comprising a recyclable label foil with at least three co-extruded layers, wherein two top layers of the label foil are made of polyethylene and each have about the same thickness, and wherein a core layer, located between the top layers, is made of polypropylene and has about 5 times to 20 times the respective thickness of one top layer;
   b) lowering a hose shaped, softened mold blank through an upper tool opening into the tool cavity; and
   c) expanding the mold blank by feeding in blow air until the plastic formable wall of the mold blank contacts the wall of the tool where the mold blank solidifies while forming a hollow body,
   wherein in step (c) the mold blank contacts the label in the location where the label is placed and forms a solid bond with the label by melting top layers of the blank and the label into each other, and wherein the two top layers are made of a mixture of low density polyethylene (PE-LD) with a density of 0.915 to 0.985 g/cm$^3$ and low density linear polyethylene (PE-LLD) with a density of 0.935 to 0.985 g/cm$^3$.

5. In a method for in-mold labeling of synthetic containers to be produced by extrusion blow molding, said method comprising the steps of:
   a) placing a label in a blow mold tool forming a tool cavity, the label comprising a recyclable label foil with at least three co-extruded layers, wherein two top layers of the label foil are made of polyethylene and each have about the same thickness, and wherein a core layer, located between the top layers, is made of polypropylene and has about 5 times to 20 times the respective thickness of one top layer;
   b) lowering a hose shaped, softened mold blank through an upper tool opening into the tool cavity; and
   c) expanding the mold blank by feeding in blow air until the plastic formable wall of the mold blank contacts the wall of the tool where the mold blank solidifies while forming a hollow body,
   wherein in step (c) the mold blank contacts the label in the location where the label is placed and forms a solid bond with the label by melting top layers of the blank and the label into each other, and wherein the two top layers of the label foil are made of an ethylene vinyl acetate copolymer (EVA) with a vinyl acetate content of 25 to 40 percent in weight.

6. In a method for in-mold labeling of synthetic containers to be produced by extrusion blow molding, said method comprising the steps of:
   a) placing a label in a blow mold tool forming a tool cavity, the label comprising a recyclable label foil with at least three co-extruded layers, wherein two top layers of the label foil are made of polyethylene and each have about the same thickness, and wherein a core layer, located between the top layers, is made of polypropylene and has about 5 times to 20 times the respective thickness of one top layer;
   b) lowering a hose shaped, softened mold blank through an upper tool opening into the tool cavity; and
   c) expanding the mold blank by feeding in blow air until the plastic formable wall of the mold blank contacts the wall of the tool where the mold blank solidifies while forming a hollow body,
   wherein in step (c) the mold blank contacts the label in the location where the label is placed and forms a solid bond with the label by melting top layers of the blank and the label into each other, and wherein the two top layers of the label foil are made of an ethylene copolymer or an ethylene terpolymer with a sealing temperature range from 60 to 85° C.

7. In a method for in-mold labeling of synthetic containers to be produced by extrusion blow molding, said method comprising the steps of:

a) placing a label in a blow mold tool forming a tool cavity, the label comprising a recyclable label foil with at least three co-extruded layers, wherein two top layers of the label foil are made of polyethylene and each have about the same thickness, and wherein a core layer, located between the top layers, is made of polypropylene and has about 5 times to 20 times the respective thickness of one top layer;

b) lowering a hose shaped, softened mold blank through an upper tool opening into the tool cavity; and c) expanding the mold blank by feeding in blow air until the plastic formable wall of the mold blank contacts the wall of the tool where the mold blank solidifies while forming a hollow body, wherein in step (c) the mold blank contacts the label in the location where the label is placed and forms a solid bond with the label by melting top layers of the blank and the label into each other, and wherein the core layer is filled with mineral filler materials with a fill content of 5 to 40 percent in weight.

8. A method as set forth in claim 7, wherein the filler material is selected from the group consisting of chalk, lime, titanium oxide and talc.

9. A method as set forth in claim 8, wherein the filler material is talc with an average particle size of 2 to 5 µm.

10. In a method for in-mold labeling of synthetic containers to be produced by extrusion blow molding, said method comprising the steps of:

a) placing a label in a blow mold tool forming a tool cavity, the label comprising a recyclable label foil with at least three co-extruded layers, wherein two top layers of the label foil are made of polyethylene and each have about the same thickness, and wherein a core layer, located between the top layers, is made of polypropylene and has about 5 times to 20 times the respective thickness of one top layer;

b) lowering a hose shaped, softened mold blank through an upper tool opening into the tool cavity; and c) expanding the mold blank by feeding in blow air until the plastic formable wall of the mold blank contacts the wall of the tool where the mold blank solidifies while forming a hollow body, wherein in step (c) the mold blank contacts the label in the location where the label is placed and forms a solid bond with the label by melting top layers of the blank and the label into each other, and wherein co-extruded adhesion-supporting layer with a thickness of 5 to 8 µm are located between each of the top layers and the core layer of the label foil.

* * * * *